United States Patent
Cuomo et al.

(10) Patent No.: US 7,366,755 B1
(45) Date of Patent: Apr. 29, 2008

(54) METHOD AND APPARATUS FOR AFFINITY OF USERS TO APPLICATION SERVERS

(75) Inventors: Gennaro A. Cuomo, Apex, NC (US); Michael L. Fraenkel, Apex, NC (US); Brian Keith Martin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1712 days.

(21) Appl. No.: 09/627,518

(22) Filed: Jul. 28, 2000

(51) Int. Cl.
*G06F 15/16* (2006.01)

(52) U.S. Cl. ............... 709/204; 709/105; 709/227; 370/230; 370/352

(58) Field of Classification Search .............. 709/204, 709/235, 239
See application file for complete search history.

(56) References Cited

U.S. PATENT DOCUMENTS

| | | | |
|---|---|---|---|
| 5,784,562 A | 7/1998 | Diener | 395/200.47 |
| 5,884,312 A | 3/1999 | Dustan et al. | 707/10 |
| 5,889,962 A | 3/1999 | Hanif et al. | 395/20.58 |
| 6,061,741 A | 5/2000 | Murphy, Jr. et al. | 709/248 |
| 6,345,291 B2 * | 2/2002 | Murphy et al. | 709/208 |
| 6,389,419 B1 * | 5/2002 | Wong et al. | 707/7 |
| 6,470,008 B1 * | 10/2002 | Khuc | 370/352 |
| 6,470,389 B1 * | 10/2002 | Chung et al. | 709/227 |
| 6,560,717 B1 * | 5/2003 | Scott et al. | 714/4 |
| 6,584,466 B1 * | 6/2003 | Serbinis et al. | 707/10 |
| 6,587,866 B1 * | 7/2003 | Modi et al. | 718/105 |
| 6,591,250 B1 * | 7/2003 | Johnson et al. | 705/51 |
| 6,606,301 B1 * | 8/2003 | Muller et al. | 370/230 |

* cited by examiner

*Primary Examiner*—David Wiley
*Assistant Examiner*—Jude J Jean-Gilles
(74) *Attorney, Agent, or Firm*—Duke W. Yee; A. Bruce Clay; Francis Lammes

(57) ABSTRACT

A method and apparatus route hypertext protocol requests to one of a plurality of application servers, which share a database through a backend database management system. The application servers store session data in the database. Hence, if a subsequent request is routed to a different application server, the session data is available through the backend database management system. One or more web servers perform routing of requests to the application server. When a request is received that is accompanied by a session ID, routing is performed by utilizing a hash function on the session ID. The resulting hash value is mapped to an application server. A hash function on a session ID will always result in the same hash value; therefore, the request will always be routed to the same application server. However, if an application server is non-functional, a new hash based on the previous hash is computed until a functional application server is selected.

3 Claims, 5 Drawing Sheets

METHOD AND APPARATUS FOR AFFINITY OF USERS TO APPLICATION SERVERS

BACKGROUND OF THE INVENTION

1. Technical Field

The present invention relates to an improved data processing system and, in particular, to a method and apparatus for managing sessions in a client/server environment. Still more particularly, the present invention provides a method and apparatus for routing requests to application servers based on a hash of the session identification.

2. Description of Related Art

The worldwide network of computers commonly known as the "Internet" has seen explosive growth in the last several years. Mainly, this growth has been fueled by the introduction and widespread use of so-called "web browsers," which enable simple graphical user interface-based access to network servers, which support documents formatted as so-called "web pages." A browser is a program that is executed on a graphical user interface (GUI) in a client computer. The browser allows a user to seamlessly load documents from a server via the Internet and display them by means of the GUI. These documents are commonly formatted using markup language protocols, such as hypertext markup language (HTML).

The client and the web server typically communicate using hypertext transport protocol (HTTP). However, when a client is accessing sensitive information from a web server, a secure protocol may be used. Hypertext transport protocol secure (HTTPS) is the protocol for accessing a secure Web server. Using HTTPS in the uniform resource locator (URL) instead of HTTP directs the message to a secure port number rather than the default Web port number of 80. The session is then managed by a security protocol. Secure sockets layer (SSL) is the leading security protocol on the Internet. When an SSL session is started, the browser sends its public key to the server so that the server can securely send a secret key to the browser. The browser and server exchange data via secret key encryption during that session.

HTTP is a stateless protocol. Therefore, every request from an HTTP client to an HTTP server is a new request and no state is maintained between requests. Conventionally, HTTP cookies are used to maintain a client-side state whereas HTTP sessions are used to manage the state information on the server side. A cookie is data created by a web server that is stored on a client computer. A cookie is used to keep track of a user's patterns and preferences and, with the cooperation of the Web browser, is stored within the client computer. Cookies contain a range of URLs for which they are valid. When the browser encounters those URLs again, it sends the appropriate cookies to the Web server.

A session is used to track the activities of a user. For example, a session may be created to allow a user to add items to a "shopping cart" using a plurality of individual requests. A session may also allow a user to use a web interface to search a database. Web interfaces may also be used to control equipment from remote locations. As web interfaces become increasingly popular, the administration of sessions used to manage multiple transactions by individual clients becomes exceedingly important. Normally, an HTTP session is created on the server side. To associate a session with a user, a number, referred to as a session identification (ID), is generated and associated with the user. The session ID is sent back to the browser as a cookie or through a URL rewriting mechanism.

However, web sites with high traffic employ a plurality of application servers to serve requests. One or more web servers route requests to the application servers and attempt to balance the loads on the servers. Prior art application servers embed knowledge into a session ID to identify the application server upon subsequent requests. When a client submits a request with a session ID, the web server must then extract that knowledge from the session ID to route the request to the proper application server.

One manner in which the server identification is embedded into the session ID is to encode a server:port pair into the session ID. This technique provides load balancing provided the initial request was load balanced properly. A plurality, usually two, of server:port pairs may also be encoded into the session ID. Thus, if the first server is not functional, another server may fulfill the request. However, this technique requires that the servers encoded into the session ID share the session information. Conventionally, the session information is shared by replication between "server buddies." As the number of servers encoded into the session ID increases, the amount of replication increases, using up more storage. The level of fault tolerance in this technique is limited to the number of server:port pairs encoded into the session ID.

Another manner in which the server identification is embedded into the session ID is to encode an index into the session ID. This technique provides load balancing provided the initial request was load balanced properly. This technique provides no fault tolerance, because if the indexed server encoded in the session ID is down, the session data is lost.

Embedding the application server identification also has the disadvantage of tying the application server and web server code. The web server must know the manner in which the server identification is encoded into the session ID to extract the server identification and route a request. Furthermore, the application servers do not efficiently share session data.

Therefore, it would be advantageous to have an improved method and apparatus for perform routing of requests to application servers independent of information embedded in the session identification.

SUMMARY OF THE INVENTION

The present invention provides a plurality of application servers, which share a database through a shared data mechanism. The application servers store session data in the shared data mechanism; therefore, if a subsequent request is routed to a different application server, the session data is available through the shared data mechanism. One or more web servers perform routing of requests to the application server. When a request is received that is accompanied by a session ID, routing is performed by utilizing a hash function on the session ID. The resulting hash value is mapped to an application server. A hash function on a session ID will always result in the same hash value; therefore, the request will always be routed to the same application server. However, if an application server is non-functional, a new hash based on the previous hash is computed until a functional application server is selected.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
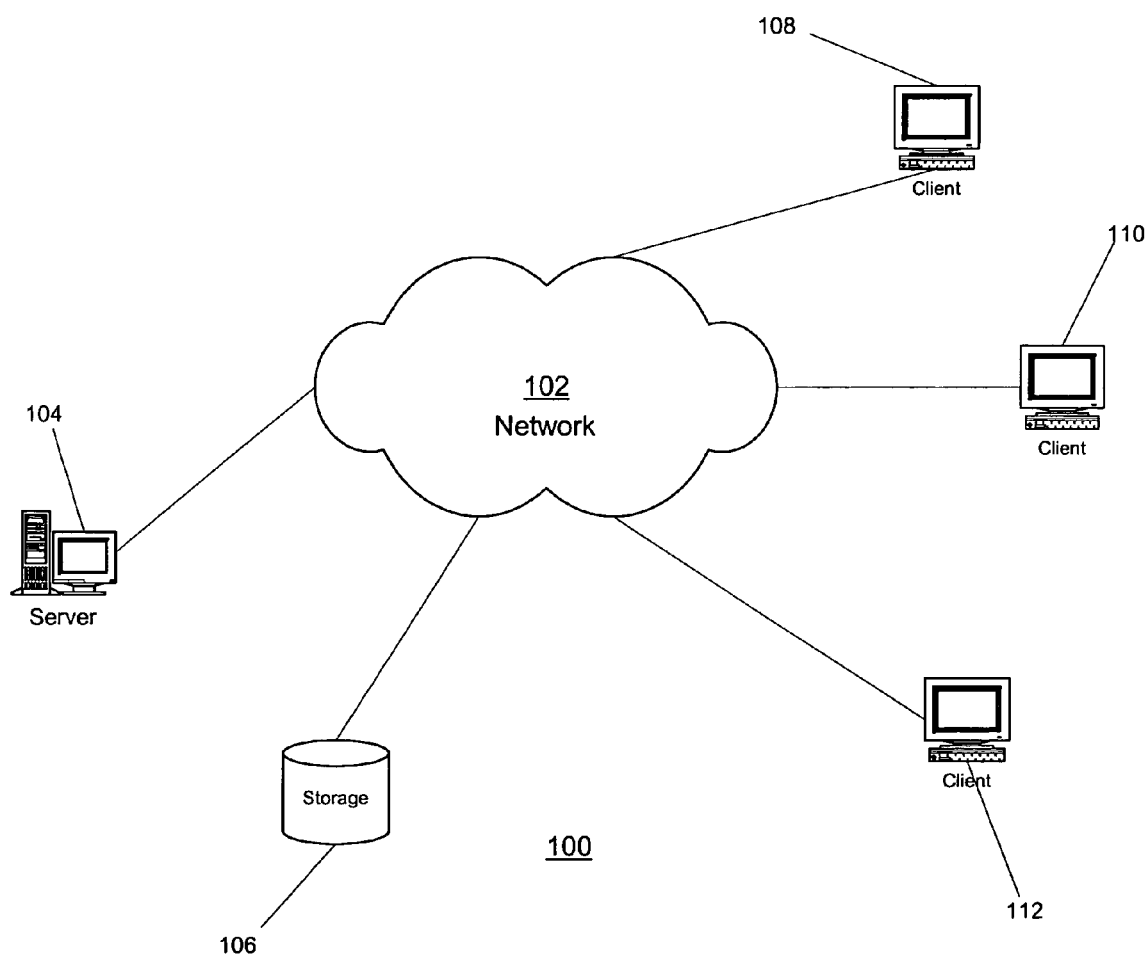
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
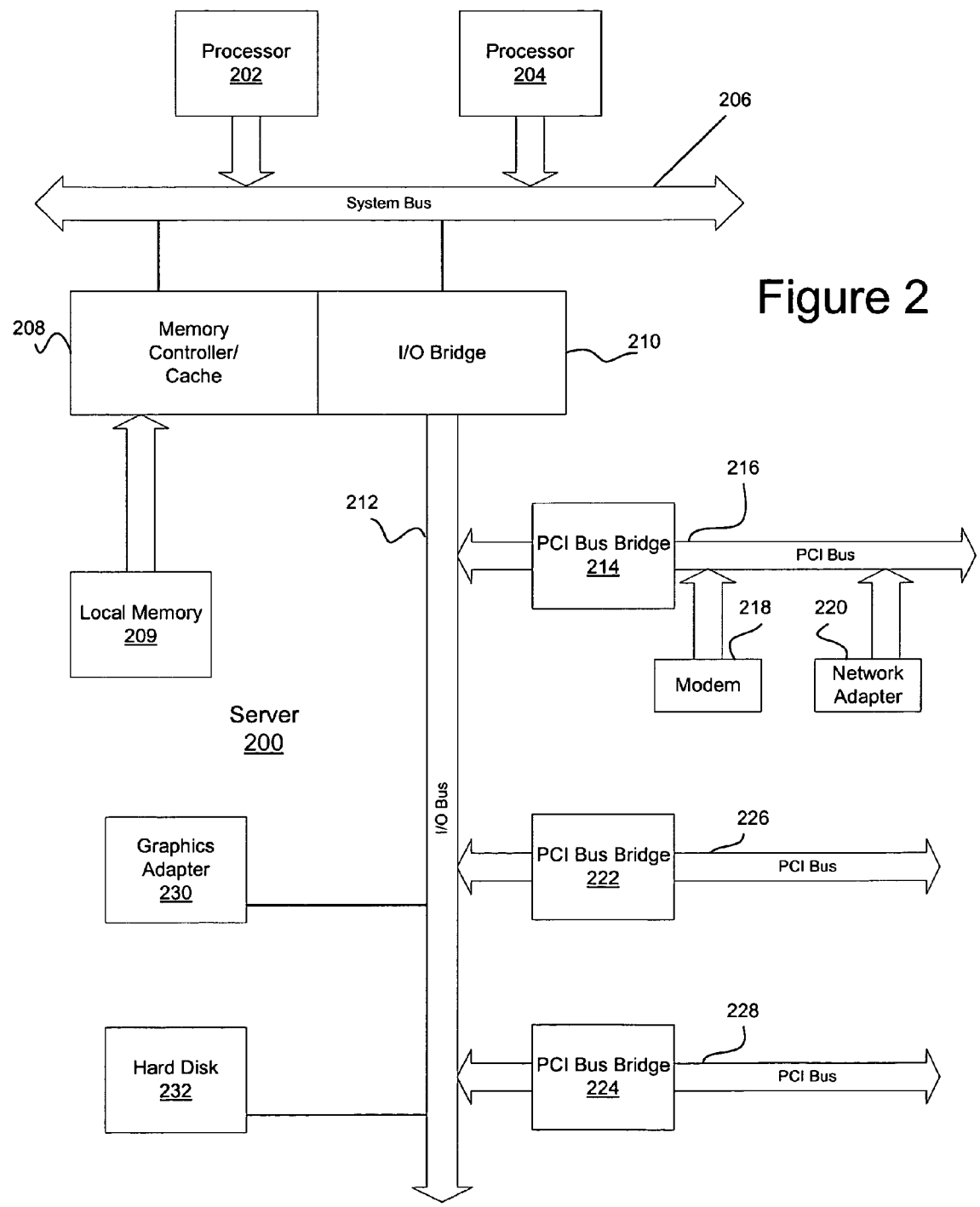
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
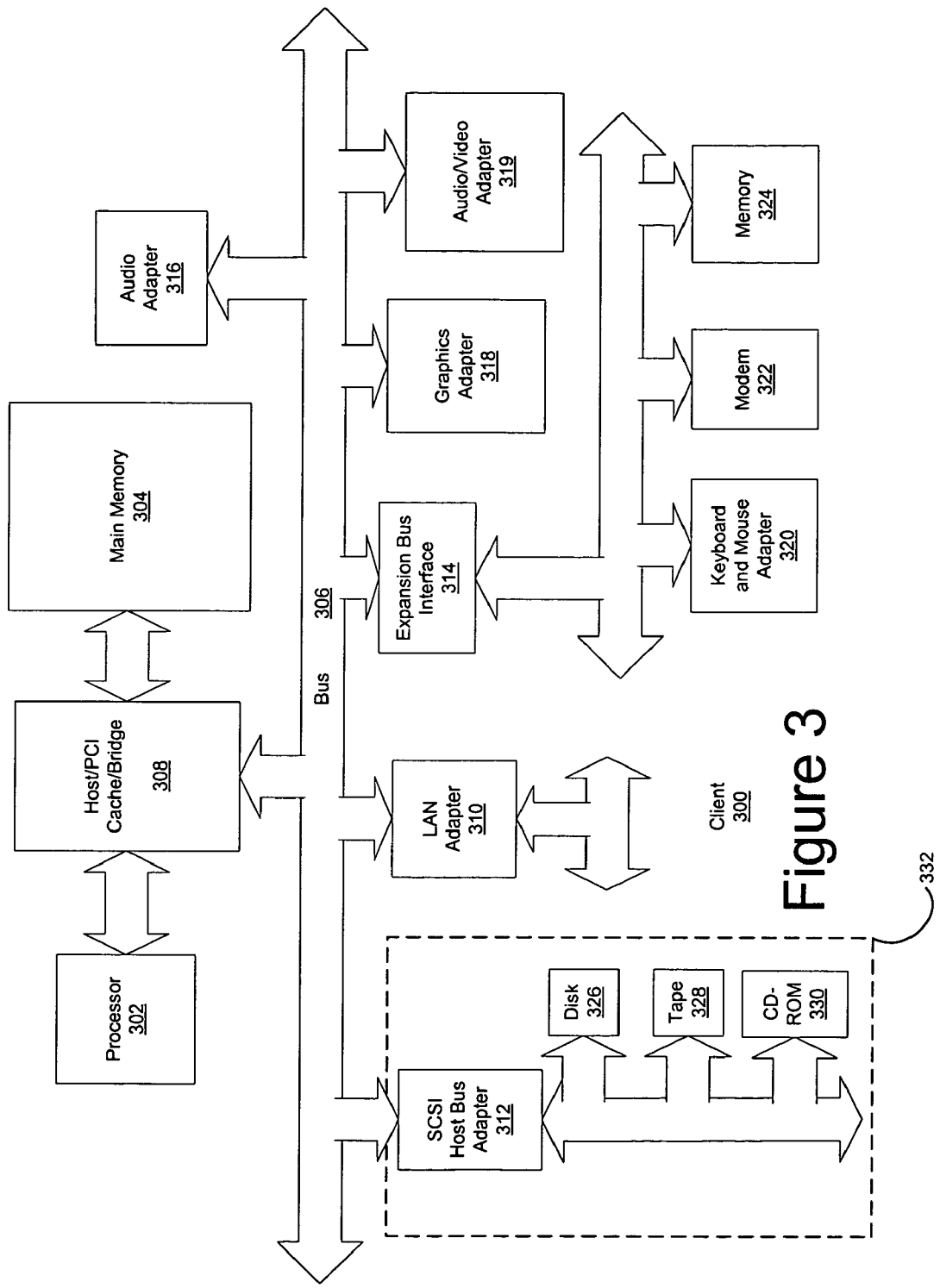
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
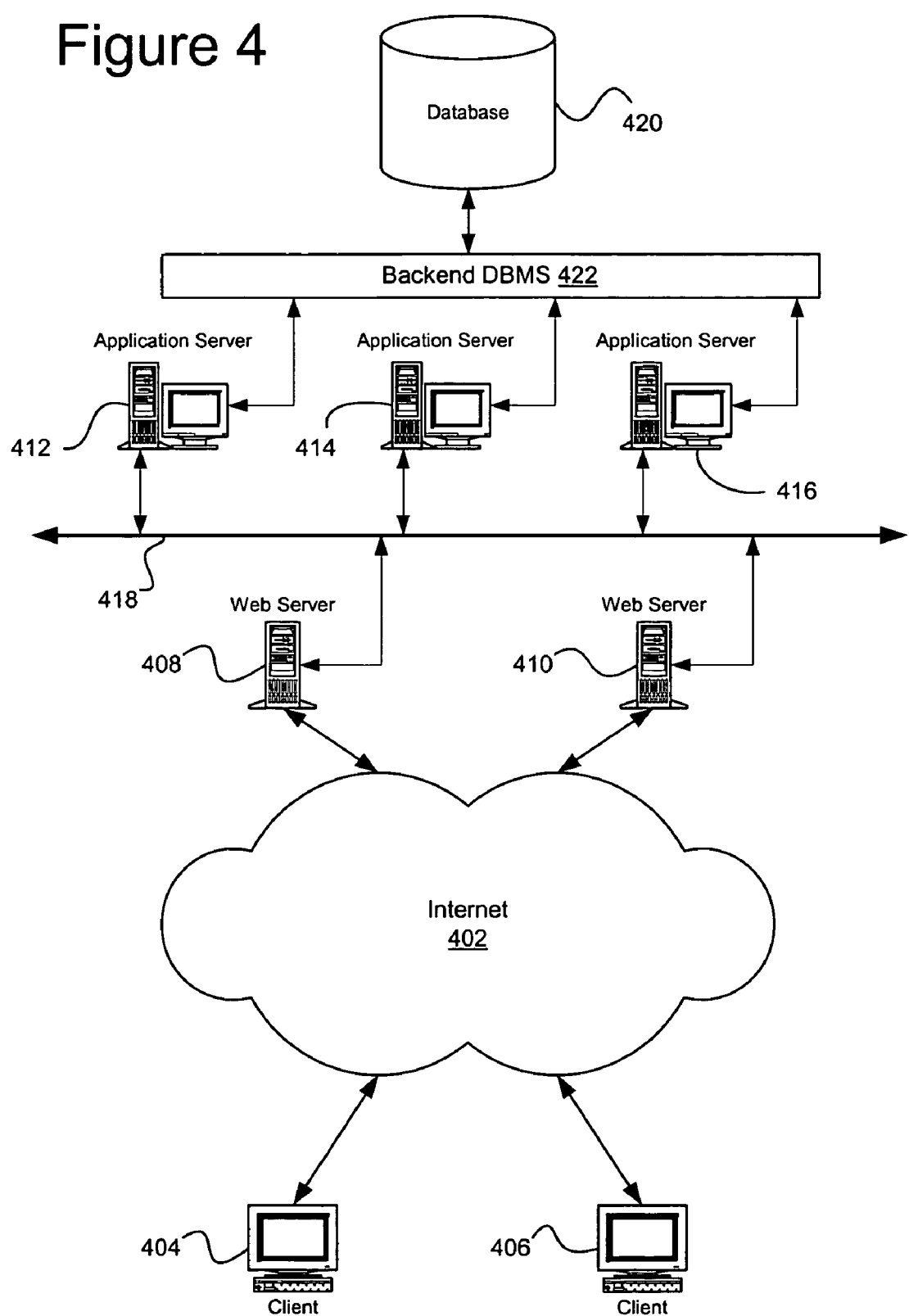
FIG. 4 depicts a specific client/server arrangement according to a preferred embodiment of the present invention.

With reference now to FIG. 4, a specific client/server arrangement is presented according to a preferred embodiment of the present invention. A network, such as Internet 402, connects clients 404, 406 and web servers 408, 410. In the depicted example, the network is the Internet; however, any network that supports HTTP protocol or uses a protocol that requires the use of sessions may be implemented.

The web servers may perform functions to serve HTTP requests; however, for the purposes of the present invention web servers 408, 410 perform routing to application servers 412, 414, and 416 through communication channel 418. Communication channel 418 may be an intranet, a local area network (LAN), or a wide area network (WAN). While the example shown in FIG. 4 comprises two web servers and three application servers, any combination of web servers and application servers may be used. As a minimum example, the present invention may employ a single web server, such as web server 408, routing requests to two application servers, such as servers 412, 414.

Application servers 412, 414, and 416 access database 420 through backend DBMS 422. The application servers store session data in the database. Thus, if an application server is non-functional or a subsequent request in a session is otherwise routed to a different application server, the session data may be retrieved and the request may be fulfilled. In an alternate embodiment, each application may have session data stored in internal storage and replicated in the centralized database. Other known distributed database techniques may be used to share session data. Furthermore, while the depicted example uses a shared database, any shared data mechanism, such as a shared file system or shared memory, may be used.

When an initial HTTP request without a session ID is received by a web server, such as web server 408, the request is routed to an application server, such as application server 412, using conventional load balancing techniques. However, when an HTTP request is received with a session ID, the web server performs a hash function on the session ID.

A hash function H, as is known in the art, is a transformation that takes an input message, referred to as m, and returns a fixed-size string, which is called the hash value h. The input may be of any length; however, the output has a fixed length. Given the same input m, a hash function will always produce the same hash value h; however, no two messages $m_1$ and $m_2$ should produce the same value h. Two messages that are hashed to produce the same hash value are referred to as a collision. A weakly collision-free hash function is one for which it is computationally infeasible, given a message $m_1$, to find an $m_2$ such that $H(m_1)=H(m_2)$. A strongly collision-free hash function is one for which it is computationally infeasible to find any two messages $m_1$ and $m_2$ such that $H(m_1)=H(m_2)$.

Typically, hash functions are used to provide a smaller "finger print" of a message to be digitally signed or time stamped. Examples of well-known hash functions are message digest 2 (MD2) and message digest 5 (MD5). Hash functions may also be used to form an index for more efficient searching. However, in the present invention, the hash function is used to produce an integer to select an application server, because each session ID will always result in the same hash value. A good hash function that distributes evenly across the application servers allows the requests to be load balanced across the application servers.

Once the hash function is computed, the web server performs a modulus function (mod) on the hash value based on the number of application servers. A modulus function divides an integer into another integer and returns the remainder. For example, for N application servers, h mod N will result in an integer i between zero and N−1. The web server then uses a look-up table to map the integer i to an application server.

Figures 5, 6:
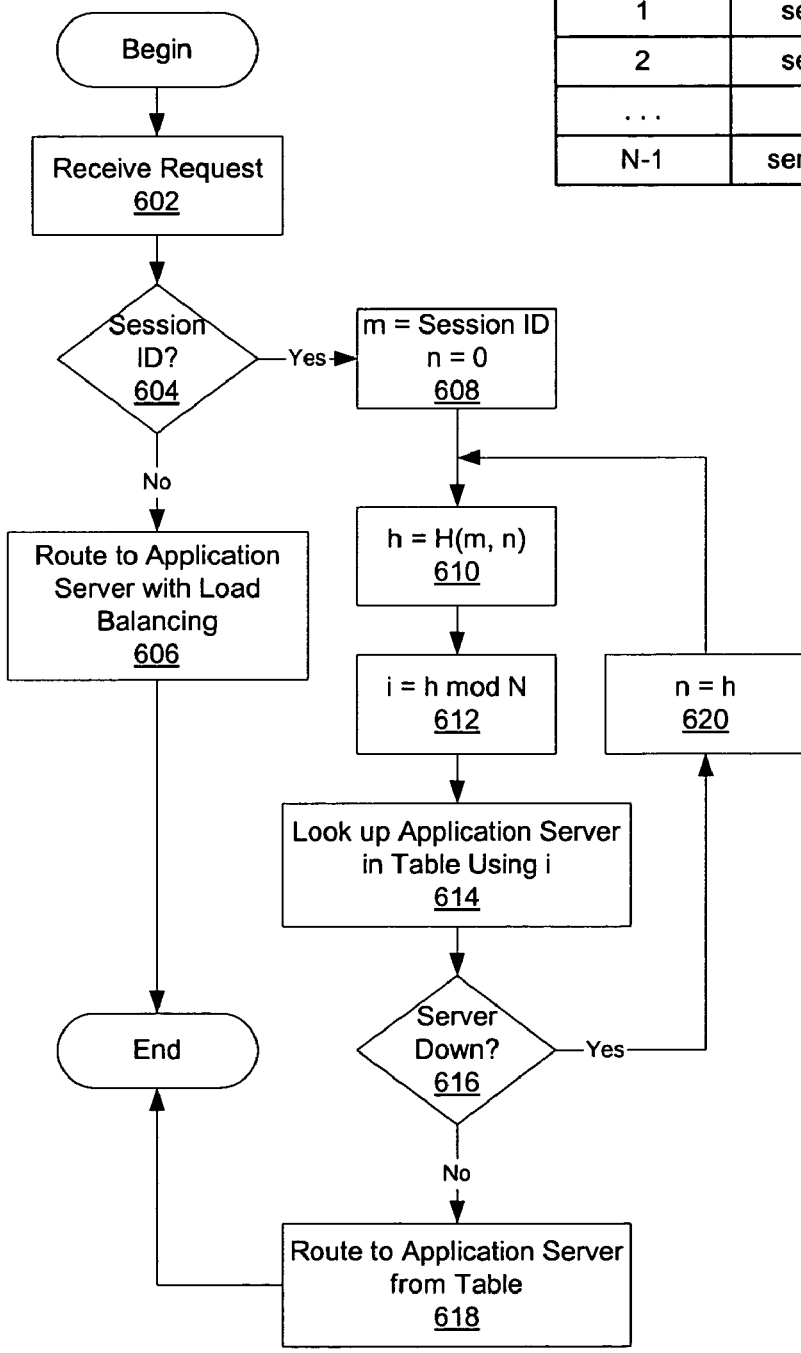
FIG. 5 is a diagram illustrating a look-up table for selecting an application server in accordance with a preferred embodiment of the present invention.
FIG. 6 is a flowchart illustrating the operation of a web server according to a preferred embodiment of the present invention.

Turning now to FIG. 5, a diagram is shown illustrating a look-up table for selecting an application server in accordance with a preferred embodiment of the present invention. The columns of the look-up table include Integer (i) indicating the integer obtained from the session ID, Server indicating a host_name:port pair identifying the server, and Down indicating whether the application server is down.

As an example, a session ID may result in a value of zero after the hash function and modulus function are performed. The web server selects server0:port and determines that the selected application server is not down. Thus, the web server routes the request to server0:port. As a further example, a session ID may result in a value of two after the hash function and modulus function are performed. The web server selects server2:port and determines that the selected application server is down. Then, the web server performs a hash function on the result of the previous hash function. A modulus function performed on the new hash value may result in a value of one. The web server then selects server1:port and determines that the selected application server is not down. Thus, the web server routes the request to server1:port.

With reference now to FIG. 6, a flowchart is shown illustrating the routing of a request by a web server according to a preferred embodiment of the present invention. The process begins and the web server receives a request (step 602). A determination is made as to whether the request includes a session ID (step 604). If the request does not include a session ID, the web server routes the request to an application server with load balancing in a known manner (step 606) and the process ends.

If the request includes a session ID in step 604, the process sets m equal to the session ID and an integer n equal to zero (step 608) and performs a hash function H on m with an initial value of n (step 610) resulting in a hash value h. The process then sets an integer i equal to h mod N, where N is the number of application servers (step 612). Thereafter, the process selects an application server from a look-up table using i (step 614) and a determination is made as to whether the server is down (step 616). The determination may be made simply by checking the appropriate column in the look-up table. The web server must then update the look-up table whenever a server goes down or returns to a functional state. In an alternate embodiment, the determination is made by performing a test of the server or by routing the request to the server and waiting for an error message to be returned.

If the server is not down, the web server routes the request to the application server selected from the table (step 618) and the process ends. If the server is down in step 616, the process sets n equal to h (step 620) and returns to step 610 to recompute the hash function. The web server recomputes the hash function until a functional application server is selected. In an alternate embodiment, the process merely increments the value of n in step 620 and returns to step 610 to recompute the hash function.

Thus, the present invention solves the disadvantages of the prior art by providing a plurality of application servers, which share a database through a backend database management system (DBMS). The application servers store session data in the database; therefore, if a subsequent request is routed to a different application server, the session data is available through the backend DBMS. One or more web servers perform routing of requests to the application server. Load balancing is achieved by utilizing a hash function on the session ID and routing based on the result of the hash function. Fault tolerance is achieved by recomputing a new hash based on the previous hash until a functional application server is selected. The use of a hash function to determine routing allows the web server to ignore the content of the session ID. Therefore, prior art application servers, which embed information into the session ID, may be used.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, HTTP is used as the protocol in the depicted examples; however, the present invention may be implemented using other protocols. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for routing a request to one of a number of servers, comprising:

receiving a request including a session identification;

performing a hash function on the session identification to form a first hash value;

performing a modulus function on the first hash value to form a first integer;

routing the request to a first server based on the first integer in response to the first server being functional;

performing a hash function on the first hash value to form a second hash value in response to the first server being non-functional;

performing a modulus function on the second hash value to form a second integer; and routing the request to a second server based on the second integer.

2. The method of claim 1, wherein the integer is between zero and the number of servers minus one.

3. The method of claim 1, wherein the step of routing the request comprises looking up the server in a look-up table using the integer.

* * * * *